United States Patent [19]
Johnson

[11] Patent Number: 6,005,928
[45] Date of Patent: *Dec. 21, 1999

[54] METHOD AND SYSTEM FOR AUTOMATIC DISTRIBUTION ADDRESSING

[75] Inventor: William J. Johnson, Flower Mound, Tex.

[73] Assignee: MCI Communication Corporation, Washington, D.C.

[ * ] Notice: This patent issued on a continued prosecution application filed under 37 CFR 1.53(d), and is subject to the twenty year patent term provisions of 35 U.S.C. 154(a)(2).

[21] Appl. No.: 08/839,748

[22] Filed: Apr. 15, 1997

[51] Int. Cl.$^6$ ........................................... H04M 1/56
[52] U.S. Cl. .................. 379/142; 379/93.23; 379/100.08
[58] Field of Search ........................... 379/67, 89, 93.03, 379/93.17, 93.23, 118, 120, 122, 127, 142, 265, 266, 93.24, 67.1, 88.11, 88.13, 202, 201

[56] References Cited

U.S. PATENT DOCUMENTS

| | | | |
|---|---|---|---|
| 5,001,710 | 3/1991 | Gawrys et al. | 379/201 |
| 5,163,087 | 11/1992 | Kaplan | 379/142 |
| 5,327,486 | 7/1994 | Wolff et al. | 379/142 |
| 5,349,638 | 9/1994 | Pitroda et al. | 379/142 |
| 5,402,474 | 3/1995 | Miller et al. | 379/142 |
| 5,533,110 | 7/1996 | Pinard | 379/202 |
| 5,546,447 | 8/1996 | Skarbo et al. | 379/142 |
| 5,602,908 | 2/1997 | Fan | 379/142 |
| 5,625,676 | 4/1997 | Greco et al. | 379/142 |
| 5,675,637 | 10/1997 | Szlam et al. | 379/142 |
| 5,724,412 | 3/1998 | Srinivasan | 379/142 |
| 5,734,706 | 3/1998 | Windsor et al. | 379/142 |
| 5,754,636 | 5/1998 | Bayless et al. | 379/142 |
| 5,758,079 | 5/1998 | Ludwig et al. | 379/202 |
| 5,907,604 | 5/1999 | Hsu | 379/142 |

*Primary Examiner*—Curtis A. Kuntz
*Assistant Examiner*—Rexford N Barnie

[57] ABSTRACT

A system and method for automatic addressing of distributions. The system receives distributions, such as phone calls, phone messages, E-mail messages, soft facsimiles, print jobs, and pages, historically maintains a set of information, such as addressing information associated with senders of the distributions. The set of address information includes the sender's name, E-mail address, phone number, fax number, pager number, LAN address, or the like. The system permits the recipient of an inbound distribution to automatically address an outbound distribution to a previous sender of the inbound distribution by invocation of hot keys, or by use of a query manager. The system also permits the recipient to paste information about the sender directly into arbitrary applications on his computer.

17 Claims, 11 Drawing Sheets

FIG. 2

Address Book Data 120

| Last Name 202 | First Name 204 | Middle Name 206 | E-mail ID 208 | Phone# 210 | LAN Addr. 212 | Fax# 214 | Page# 216 | SVCS2TRK 218 | Depth 220 | Password 222 | Col.12 | 224 ... | Col.N |
|---|---|---|---|---|---|---|---|---|---|---|---|---|---|
| person 1 | | | | | | | | | | | | | |
| ... | | | | | | | | | | | | | |
| person n | | | | | | | | | | | | | |

FIG. 3

Automatic Addressing Data 122

| Unique ID 302 | Date/Time 304 | Name 306 | E-mail ID 308 | Phone # 310 | Fax # 312 | LAN Address 314 | Pager # 316 | Assigning SVC 318 |
|---|---|---|---|---|---|---|---|---|
| ID1 | | | | | | | | |
| ... | | | | | | | | |
| IDn | | | | | | | | |

METHOD AND SYSTEM FOR AUTOMATIC DISTRIBUTION ADDRESSING

CROSS-REFERENCE TO RELATED APPLICATION

This application is related to commonly owned, co-pending U.S. patent application Ser. No. 08/672,134, filed Jun. 27, 1996, entitled "System and Method for Automated Speed Dialing," which is incorporated herein by reference.

BACKGROUND OF THE INVENTION

1. Field of the Invention

The present invention is directed to computerized telecommunications, and more particularly, to automated addressing of distributions, such as E-mail messages, phone calls, paging, faxing, printing, letter writing, or the like.

2. Related Art

Many E-mail systems provide convenient methods for addressing mail to users of the E-mail system. For example, several commercially available software products include a personal and/or enterprise address book for convenient searching of mail addresses (an enterprise being a business, group of businesses, or simply a collection of people). Further provided is convenient placement of the mail addresses in the E-mail address field with a simple point and click of the mouse. Many E-mail systems also provide methods for automatic addressing according to addresses on a previously distributed E-mail item. The system will automatically set recipient addresses in response to particular user actions such as forwarding, resending or answering a E-mail distribution. Automatic addressing is very useful.

A person often uses an E-mail system to send mail to people on matters associated with phone calls, voice mail, fax (facsimile) jobs, print jobs, or being paged. There is no method for automatically completing recipient address information according to previous distributions that may be related to a subsequently distributed E-mail item. For example, consider a person who is traveling, is paged, and responds to the page to discover an emergency business situation. Upon handling the emergency situation, the person wants to send an E-mail item to the person whom initiated the page in order to summarize the situation.

It is desirable to have a method that allows the person to send E-mail that automatically sets the recipient address field according to the person who last paged. Thus, a method is needed for automatic completion of E-mail recipient address information when an E-mail item is related to previous distributions.

SUMMARY OF THE INVENTION

The present invention is directed to a method and system for automatically completing recipient address information (person's name, E-mail address, destination phone number, destination fax number, destination pager number, destination LAN address, or the like) according to previous office communications (hereafter called distributions). The history of distributions, including phone calls, phone mail, pager notifications, fax jobs, and print jobs, or the like, is saved in first-in-first-out order. The history is saved in a manner that allows a user to automatically recall any particular address type (person's name, E-mail address, destination phone number, destination fax number, destination pager number, destination LAN address, or the like) associated with a particular distribution. Upon user invocation, the distribution addresses are conveniently accessed and automatically placed into recipient addresses of outgoing distribution types. Thus, the user is saved from searching an address book or spending time to determine recipient person's name, E-mail address, destination phone number, destination fax number, destination pager number, destination LAN address, or the like.

A simple function key or mouse invocation allows automatic filling of the recipient address information. Without actually knowing or caring about a person's particular distribution address, a user is able to perform a simple recipient address assignment name, E-mail address, phone number, fax number, pager number, LAN address, or the like to a person who recently called, left a phone message, sent a fax, sent an E-mail item, notified by pager, printed a document on the attached printer, or communicated in some fashion.

A query facility is also provided for dragging and dropping from the query facility to destinations.

In an alternative embodiment of the present invention, predetermined selected fields can be populated to distribution history rather than the entire set of address information for previous senders of distributions. The desired fields can be selected using hot keys according to a user specified protocol.

BRIEF DESCRIPTION OF THE FIGURES

The present invention will be described with reference to the accompanying drawings, wherein:

FIG. 2 illustrates an exemplary format for an address book (AB) database 120, in connection with the present invention.

FIG. 3 illustrates an exemplary format for an automatic addressing database (AAD) 122, in connection with the present invention.

The preferred embodiment of the invention is described below with reference to these figures where like reference numbers indicate identical or functionally similar elements. Also in the figures, the leftmost digit of each reference number corresponds to the figure in which the reference number is first used.

DETAILED DESCRIPTION OF THE PREFERRED EMBODIMENTS

The preferred embodiment of the invention is discussed in detail below. While specific steps, configurations and arrangements are discussed, it should be understood that this is done for illustrative purposes only. A person skilled in the relevant art will recognize that other steps, configurations and arrangements can be used without departing from the spirit and scope of the invention.

Figure 1:
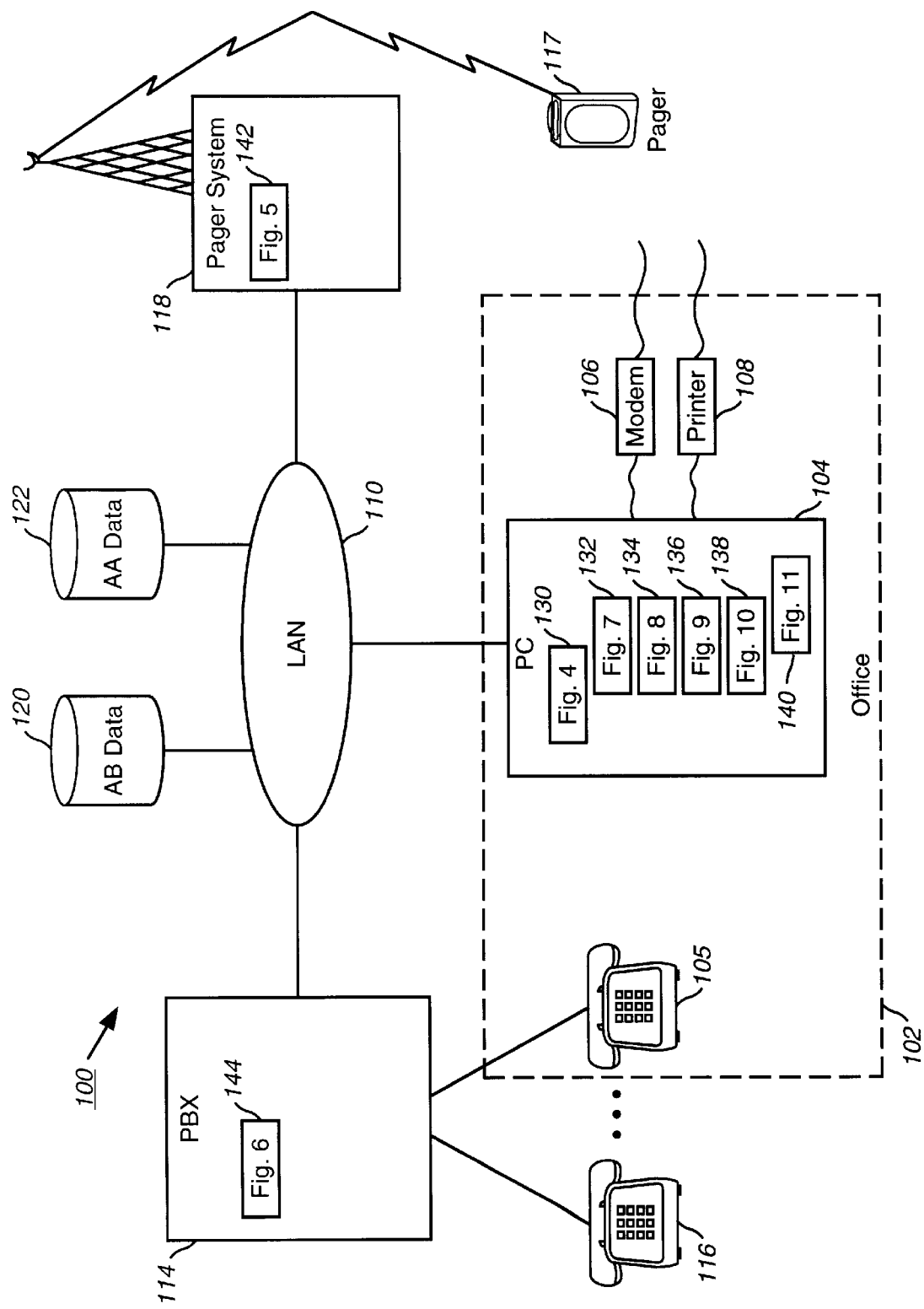
FIG. 1 illustrates a high-level block diagram of an environment for implementing automatic distribution addressing according to the present invention.

FIG. 1 illustrates a high-level block diagram of a system for implementing the present invention. A communications topology 100 includes an office environment 102 having at least one personal computer (PC) 104, a telephone 105, a modem 106, and a printer 108. Connected to a LAN 110 is a telephone system, such as a private branch exchange (PBX) controller 114 or an equivalent telephone system. Connected to PBX 114 is a telephone 116. A pager 117 and pager system 118 are connected to the LAN 110. Also connected to the LAN 110 is an address book (AB) database 120 and an automatic addressing database (AAD) 122. The PC 104, PBX 114, pager system 118, and databases 120 and 122 are connected to LAN 110 in a conventional manner as would be apparent to a person skilled in the relevant art.

In the preferred embodiment, each platform, for example PC 104, PBX 114, pager system 118, contains a platform dependent set of application programming interfaces (API) for accessing the enterprise AB 120 and writing information to the AAD 122. The AB 120 is preferably a single shared repository whereby each platform has a particular native communications interface to the AB 120. Likewise, the AAD 122 is preferably a single repository that is accessed from various components of the present invention.

As a page is received, the caller ID number of the person initiating the page is captured by the pager service, using known ANI (automatic number identification) techniques, or the like. The caller ID is used by the page manager 142 as a key to access data within the AB 120 and the corresponding person's name and addressing information is retrieved. This information is then written to the AAD 122. The page manager 142 is described below in connection with FIG. 5.

As phone calls are received or a voice mail message is recorded, the caller ID number is captured, via PBX 114 signals, ANI, or the like. For calls that complete successfully, the caller ID is used by the phone system manager 144 as a key to access data within the AB 120 and the corresponding person's name and addressing information is retrieved. This information is then written to the AAD 122. The phone system manager 144 is described below in connection with FIG. 6.

The PC 104 includes a configurator 130, an E-mail manager 132, a fax manager 134, a print manager 136, a query manager 138 and a hot key TSR (terminate and stay resident) application program 140.

A user of PC 104 specifies a set of participating services to be monitored for distributions maintained as a historical collection in the AAD 122. This monitoring is performed by the configurator 130. Detailed operation of the configurator 130 is described below in connection with FIG. 4. The user will also specify an AAD depth N for maintaining a historical collection of addressing information associated with received distributions. The last N distributions are historically collected. An SQL database example defining AAD 122 in a row and columns format is illustrated in FIG. 3.

Participating services are applications that can execute as the result of a desktop computer, a laptop computer, or a PDA (personal data assistant). Similar communications for each environment will be used to perform data storage and retrieval. Of course, distribution service managers (32, 134, 136, 142, 144) must be active and enabled to the AB 120 and AAD 122 for distribution to occur.

Alternate embodiments of distribution service managers can store many varieties of information in the AAD 122. Addressing information and many other types of information can be referenced by the hot key manager 140 or query manager 138 for convenient information pasting.

The E-mail manager 132 is described below in connection with FIG. 7. The E-mail manager 132 inserts entries into the AAD 122 based on received E-mail distributions in an E-mail application. The source address is captured and used as a key to access data within the AB 120 and the corresponding person's name and addressing information is retrieved. This information is written to the AAD 122.

As soft faxes are received on the computer system or by the computer system fax server component, the caller ID number is captured. The caller ID is used by the fax manager 134 as a key to access data within the AB 120 and the corresponding person's name and E-mail addressing information is retrieved. This information is then written to the AAD 122. The fax manager 134 is described below in connection with FIG. 8.

As print jobs are received on the computer system or by the computer system print server component, the LAN requester identifier of the submitter is captured. The LAN requester identifier is used by the print manager 136 as a key to access data within the AB 120 and the corresponding person's name and addressing information is retrieved. This information is then written to the AAD 122. The print manager 136 is described below in connection with FIG. 9.

Further provided is means for querying the current history of distributions and associated addressing information. This facility can make use of a shadowed copy to enable dynamic refreshes to an active window. Configuration of a large queue depth may burden a user with determining an E-mail address for a person who paged the user 10 pages ago. Therefore, provided is enablement for dragging and dropping addresses from the query manager 138 to any application that supports drag and drop text. A user can also copy information from the query manager 138 for pasting into other applications. A user can use the query manager 138 to keep track of relevant distribution information. The query manager 138 is described below in connection with FIG. 10.

The hot key manager 140 provides configuration of hot keys that can be utilized to invoke automatic addressing into an arbitrary application, for example, a currently started mail distribution. In the case of using a hot key, the active cursor provides a target for the addressing information (name, E-mail address, phone number, fax number, pager number, LAN address, or the like), thereby allowing automatic fill to a recipient field, copy field, blind copy field or other addressing information field. The preferred embodiment of the hot key manager 140 will support functional hot keys that will be described below in connection with FIG. 11.

Thus, the present invention allows a user to automatically retrieve address book data (e.g., addressing information) into an application running on the user's computer with the use of a graphical user interface (GUI), or hot keys. For example, assume the user has recently received a telephone call. The user can move the cursor on screen and paste the name of that recent caller, paste the caller's E-mail ID, paste the caller's phone number, paste the caller's fax number, paste the caller's pager number, or paste the caller's LAN address directly into a file, or application, that is open on the user's computer. According to the present invention, the ability of the user to insert this information is a direct result of the person simply communicating to the user. In the example, information about the caller is automatically derived from the address book record in the AB 120 associated with the caller. Thus, the information associated with the caller can be inserted into any application on the user's computer that supports conventional cut and paste clipboard functions, such as those common to window-based GUI's.

Similarly, if a user receives an E-mail, the user can paste any or all of the fields from the sender's address book record into any application using hot key commands. Suppose a user wishes to respond to a recently received phone mail (voice) message using E-mail. The user can paste the E-mail ID of the person who left the phone mail message automatically into the user's E-mail application by invoking a hot key sequence according to the present invention. The hot key semantics are analogous to instructing the computer to "paste the person's E-mail ID who just called me." Once the user invokes the hot key, the E-mail ID of the person who just called the user will be inserted it into the application "hot spot." The term "hot spot" is used in the field of graphical user interfaces to indicate the point on the GUI where the cursor is currently located.

In summary, no matter what distributed type is sent to the user, whether it be an E-mail, a phone call, a fax, a page (beeper message/call-back), or a print request if the user's computer functions as a print server, with the aid of hot keys the user can paste information about the people that originated the distributions into the active cursor location of any application on the user's computer. Moreover, the user can specify what part (e.g., field(s)) of the data from that address book record are to be automatically retrieved.

The AB 120 is a resource that stores typical address information for an enterprise or business. Information stored in AB 120 includes, but is not limited to, employees' names, telephone numbers, and addresses (e.g., business address and/or mail stop). The AB 120 can also store an employee's E-mail address and their PBX identification (ID) number (henceforth called the caller ID or similar identifier). If an employee has fax capability, that employee's fax number can be associated within AB 120. Similarly, the employee's LAN address can also be stored in the AB 120.

A commercially available address database that demonstrates a good model for the AB 120 of the present invention is IBM®'s OV/VM CALLUP™ system. (IBM is a registered trademark and OV/VM CALLUP is a trademark of International Business Machines Corporation.)

FIG. 2 illustrates a format for address book data stored within AB 120. A row exists in the table for each person in the enterprise. Each row of the table includes data concerning that person's name (constructed from First Name field 204, Middle Initial field 206 and Last Name field 202), E-mail identifier (ID) field 208, phone number field 210, LAN address field 212, fax number field 214 and pager number field 216.

A "services to track" (SVCS2TRK) field 218 includes a bit mask corresponding to those distributions that the particular user configured to be tracked for automatic distribution addressing. A simple bit mask is the format for the SVCS2TRK field 218. An 8-bit field is used in the preferred embodiment. Moving from the least significant bit to the most significant bit, the distributions to track include: pager bit, printed bit, an fax bit, a E-mail bit, and phone call/mail bit. The three most significant bits are available for other distribution types. A logic "1" in a field of the bit mask indicates that service is to be tracked. For example, a mask "00001100" indicates that only E-mail and fax distributions are to be tracked for automatic distribution addressing according to the present invention.

If only the first bit is set, the AAD 122 will only fill up with the historical collection of people who have paged the user. All or any subset of the bits can be set. Thus, each distribution type that is set to be tracked by the SVCS2TRK field 218 will cause a row to be added to the AAD 122. When a new distribution is received, the system does a query on the AB 120 based on the mechanism by which the communications is sent, and the system accesses the sender's entire address book row. That row is stored into the AAD 122 so that at some future time the user can invoke the correct hot key sequence to pull-up the appropriate information out of the AAD 122 where the desired data is stored.

A depth field 220 is used to specify the total number of distributions to be tracked for a given person within the enterprise. Alternatively, the depth field can include multiple entries to specify the depth (i.e., the number) of distributions to track for each type of distribution. Finally, a password field 222 can be included to permit authorized maintenance of the AB 120. Other potential AB 120 columns can be included, as shown generally at columns 224.

The AAD 122 is a collection of rows of data retrieved from the AB 120 based on received distributions. A user will have a predetermined maximum number of rows that can be added to the AAD 122. This maximum number of AAD rows is limited by the depth field 220 in AB 120. For example, if the depth value in AB 120 is 10, the system will only keep up to 10 of the last communications (i.e., distributions) to that user, and so on. Alternatively, the depth field could be expanded to permit tracking on a distribution-type basis. For example, the AB 120 could have a separate depth field for each distribution type, rather than a single depth field for all distributions.

The ability for automatically addressing E-mail messages, for example, is prohibited if the AB 120 does not include a row corresponding to the sender of a received distribution. For example, if an E-mail is received, the sender's E-mail ID is used as a reference to index the AB 120. The sender can be designated as unknown if no matching E-mail ID is found. Therefore, automatic distribution addressing according to the invention will not be performed. The automatic distribution addressing system does not abort when the source of the distribution is not found in the address data book. The system simply does not update the AAD 122 with a new automatic distribution assignment if there is no entry found in the AB 120 for the source (sender) of a particular distribution.

Turning to FIG. 3, since in the preferred embodiment there is one AAD 112 for an entire enterprise, a unique ID field 302 is used to specify rows present for a particular person in the enterprise. The unique ID field 302 may be Social Security number, employee serial number, phone number, etc. Unique ID field 302 allows identifying all rows owned by a particular person for access (see step 1152). The maximum number of rows for a unique ID in AAD 122 corresponds to the maximum depth field 200 in AB 120.

A date/time stamp field 304 provides means for determining the relative age of rows added to AAD 122. Thus, if the depth is set to 10 and an 11th distribution is received, the date/time field 304 is used to identify and replace the oldest row with one corresponding to the new distribution.

A name field 306 is constructed using three address book fields: last name, first name, middle initial. An E-mail ID field 308, phone number field 310, fax number field 312, LAN address field 314 and pager number field 316 are also constructed using corresponding fields in AB 120. According to the preferred embodiment, there are six formatted fields that the user can automatically paste into applications. The six fields include the name 306, E-mail ID 308, phone number 310, fax number 312, LAN address 314 or pager number 316 of the person who communicated to the user. An alternative embodiment can store other useful fields that can be pasted automatically.

To permit the user to query on a per-distribution type basis, an assigning service (SVC) field 318 is also included in the AAD 122. The assigning service field 318 is populated with the specific service that generated that corresponding row in AAD 122. The query manager 138 allows the user to view a scrollable window of all his/her current entries in the AAD 122. The query manager 138 will be described further in connection with FIG. 10. A user can actually drag and drop from the window or copy an entry from that window to a clipboard. The user can assess the assigning service field 318 to figure out how a particular row was created (e.g., did the sender call, send an E-mail, or send a fax?).

The data can be simply copied from the AB 120 to fill the fields within rows of the AAD 122, or pointers can be used, as would be apparent to a person skilled in the relevant art.

The use of hot keys to paste data from the AAD 122 into an application or file on the user's computer is fundamentally the same as the use of hot keys by other conventional software packages. That is, pressing (invoking) a hot key sequence using the keyboard of the user's computer is interpreted as a predefined operation. The predefined operations of the hot keys in connection with the present invention, however, perform automatic distribution addressing, which is a novel aspect of the present invention.

The hot key sequences described here with reference to the present invention have been assigned unique sequences in an attempt not to conflict with other computer applications that use hot keys. In the preferred embodiment, hot keys to perform automatic distribution addressing according to the present invention are invoked by simultaneously holding down the control (ctrl) and shift keys while pressing the first letter of the two-letter command, then pressing the second letter alone, followed by a number alone. Other invocation methods would become apparent to a person skilled in the relevant art. Table 1 lists exemplary hot keys according to the present invention.

TABLE 1

| | Meaning |
|---|---|
| First Letter | |
| d | last (or nth to last) distribution of any type received |
| c | last (or nth to last) phone call received |
| e | last (or nth to last) E-mail received |
| f | last (or nth to last) fax received |
| p | last (or nth to last) print job received |
| b | last (or nth to last) beeper (page) received |
| Second Letter | |
| r | entire formatted row of AAD fields |
| n | person's name |
| e | person's E-mail address |
| p | person's phone number |
| f | person's fax number |
| l | person's LAN address |
| b | person's beeper number |
| Number | |
| 0 | the last distribution received |
| n | the nth to last distribution received |

The first letter of the two-letter command specifies the distribution type for consideration when retrieving from the AAD 122. The letter "d" specifies the "last" or "nth-to-last" distribution of any type received. The letter "c" specifies the "last" or "nth-to-last" phone call received. The letter "e" specifies the "last" or "nth-to-last" E-mail received. The letter "f" specifies the "last" or "nth-to-last" fax received. The letter "p" specifies the "last" or "nth-to-last" print job received. The letter "b" specifies the "last" or "nth-to-last" page received.

The second letter of the two-letter command specifies what row information to retrieve from the AAD 122. The letter "r" specifies the entire formatted row in which case all fields are retrieved from the AAD 122 with commas separating indicated field strings. The letter "n" specifies the name field 306. The letter "e" specifies the E-mail ID field 308. The letter "p" specifies the phone number field 310. The letter "f" specifies the fax number field 312. The letter "1" specifies the LAN address field 314. And the letter "b" specifies the beeper number field 316.

Finally, the number following a two-letter command corresponds to the specific row desired on a first-in, first-out basis. In other words, the number "0" represents the most recently received distribution, depending on which first letter (i.e., which specific distribution type) is selected. For example, if the first letter pressed is "c", together with the letter second letter "r", followed by the number "0", the entire row of formatted information corresponding to the last received phone call will be retrieved from the AAD 122.

As a further example, assume there are 10 rows in the AAD 122, and row number 2 and row number 7 are the only two phone call distributions, the keystrokes {ctrl, shift, c, n, 1} will pick up row number 7, because it was the first-to-last person who called by phone. The command {ctrl, shift, c, e, 3} will access the row corresponding to the third-to-last person who called, and paste that person's E-mail address into the hot spot on the user's computer. If a row for the third-to-last person who called is not found in the AAD 122, a not found error beep notifies the user.

Figure 11:
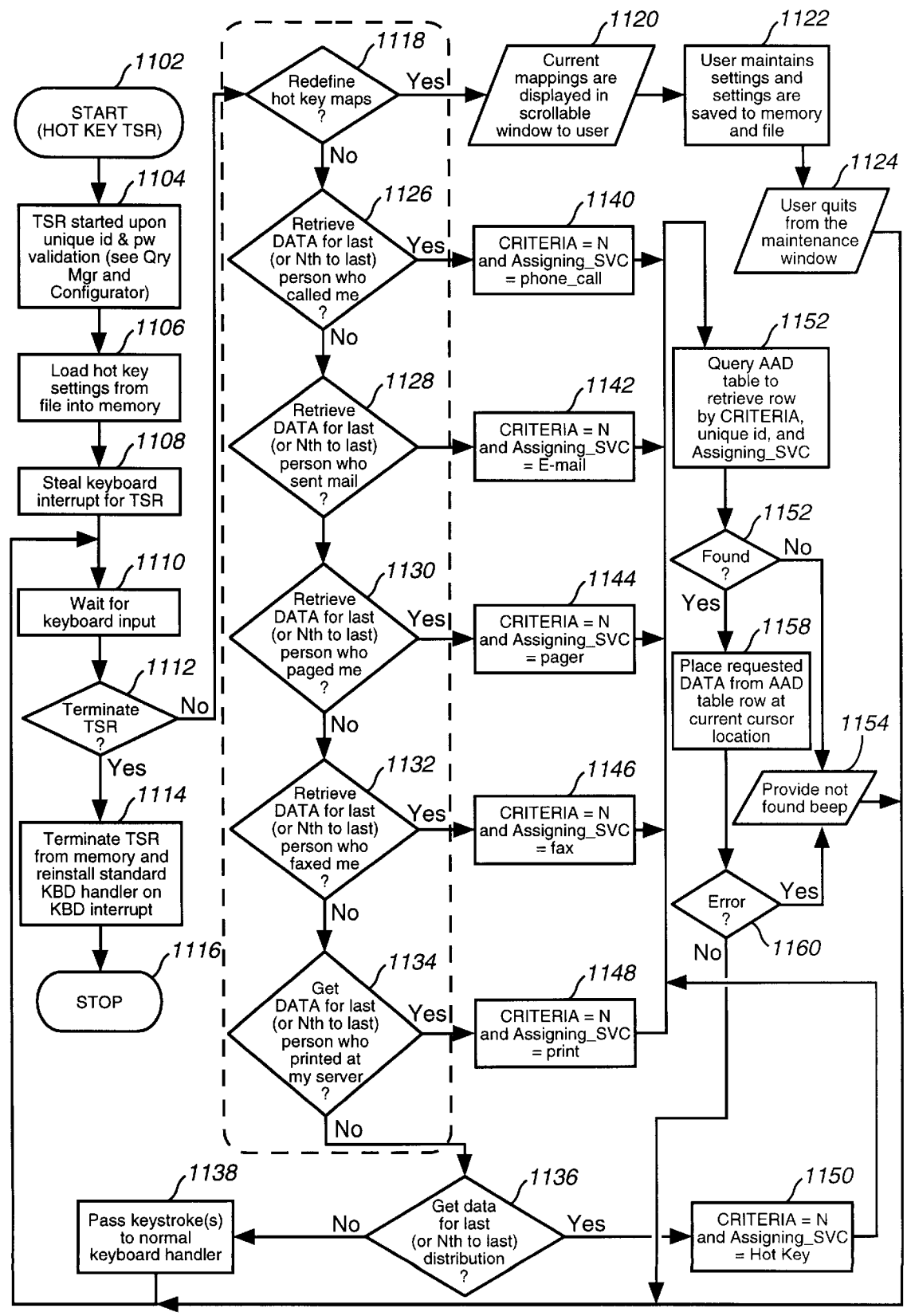
FIG. 11 illustrates operation of a hot key manager 140, in accordance with the present invention.

The hot key manager 140 can be implemented as a TSR (terminate and stay resident) application program, as would be apparent to a person skilled in the relevant art. FIG. 11, described below, is a flow diagram illustrating how a user can assign hot keys, rather that using the defaults of Table 1.

Figure 4:
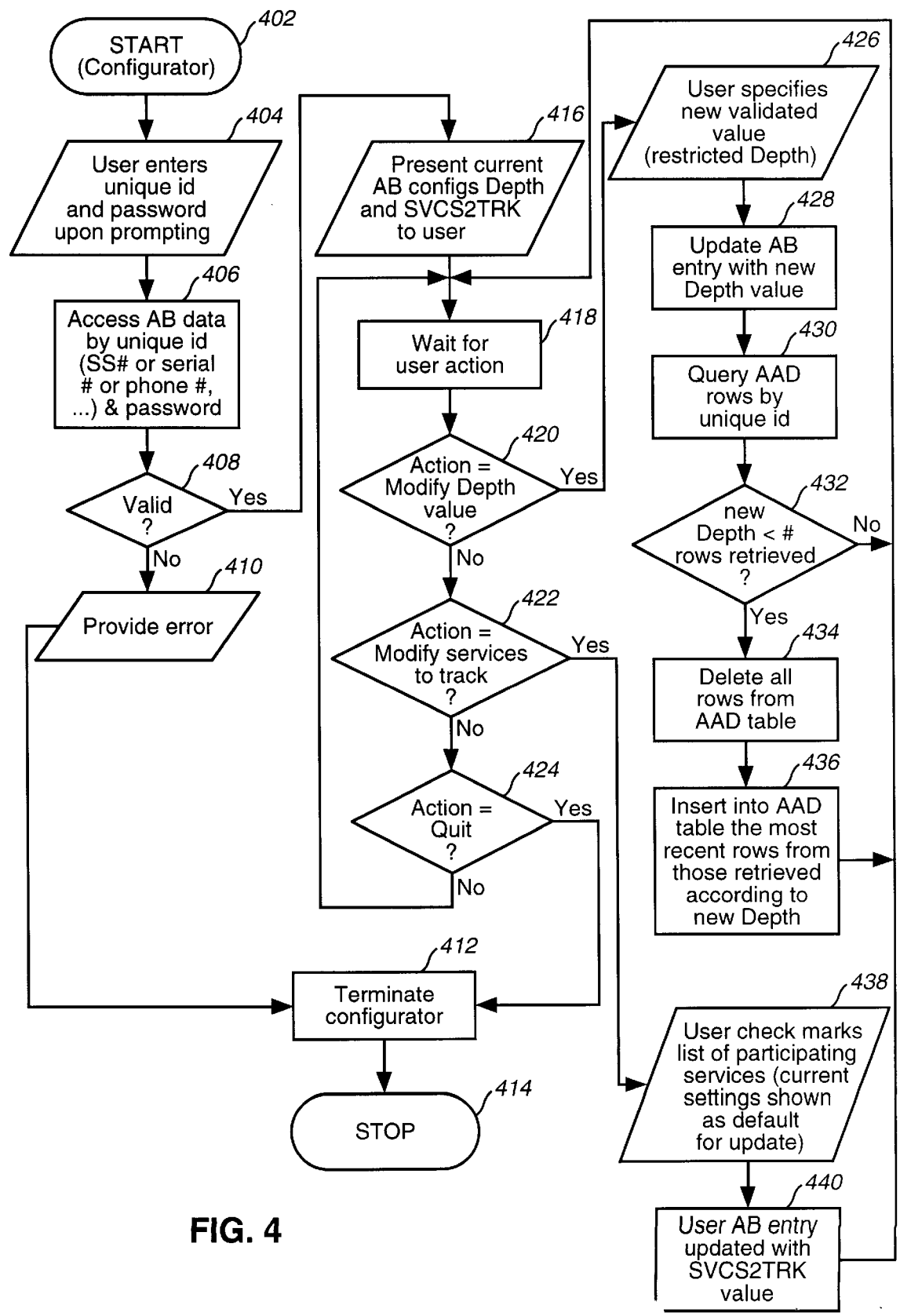
FIG. 4 illustrates operation of a configurator 130, in connection with the present invention.

FIG. 4 illustrates operation of the configurator 130 to permit a user to configure his address book row in AB 120 to specify the distributions to track and to set the depth count. The operation begins at a step 402. The user must first enter his unique ID and a password to validate that he is working with the row that he owns, or is authorized to work with, as shown at a step 404 (unique ID may be in fields 224 or AB 120). The address book data is accessed using the unique ID (e.g., social security number, phone number, or the like) to access his row of information, as shown at a step 406. As determined in step 408, if the password is not valid, the specified unique ID does not match, or if there is no address book row for this unique ID, then an error is provided to the user in step 410, and the configurator operation is terminated in step 412. Finally, the configurator stops operation at a step 414.

Otherwise, if step 408 determines an authorized AB row is found, the current depth and services to track (SVCS2TRK) field values are presented to the user, as show at a step 416. The configurator waits for user action at a step 420. The user is permitted to perform three operations: the user can (1) modify the depth value, as determined at a step 422, (2) modify the services to track value, as determined at a step 422, or (3) quit, as determined at a step 424.

If the user selects to modify the depth value, he is permitted to specify a new value, as shown at a step 426, but is limited by some reasonable restriction to conserve system resources. Then AB 120 is updated with the new value entered by the user, as determined at a step 428. In step 430, all rows are retrieved by querying the AAD 122 for that person, because if the user specified a depth value less the current value, older rows must be deleted. If the new depth value is less that the current depth value, as determined at a step 432, all rows corresponding to the user are deleted from the AAD 122 (step 434) and the number of newest rows corresponding to the new depth value are stored back into the AAD 122, as shown at step 436. Once the AAD 122 is updated after step 436, or the new depth value is determined to be greater than the current depth value at step 432, the process then returns to step 418.

Alternatively, if the user selects to modify the services to track, as determined at step 422, the user is presented with a list of all the services and is permitted to select only those to track, as shown at a step 438. The current settings are displayed as defaults. The user's selection is then updated in the AB 120, as shown at a step 440. The process then returns to step 418.

Alternatively, if the user selects to quit the configurator 130, as determined at step 424, the configurator 130 terminates in step 412 and the processing stops at step 414. If the user did not select an action as determined by steps 420, 422, and 424, then step 418 continues to monitor for those actions.

Figure 5:
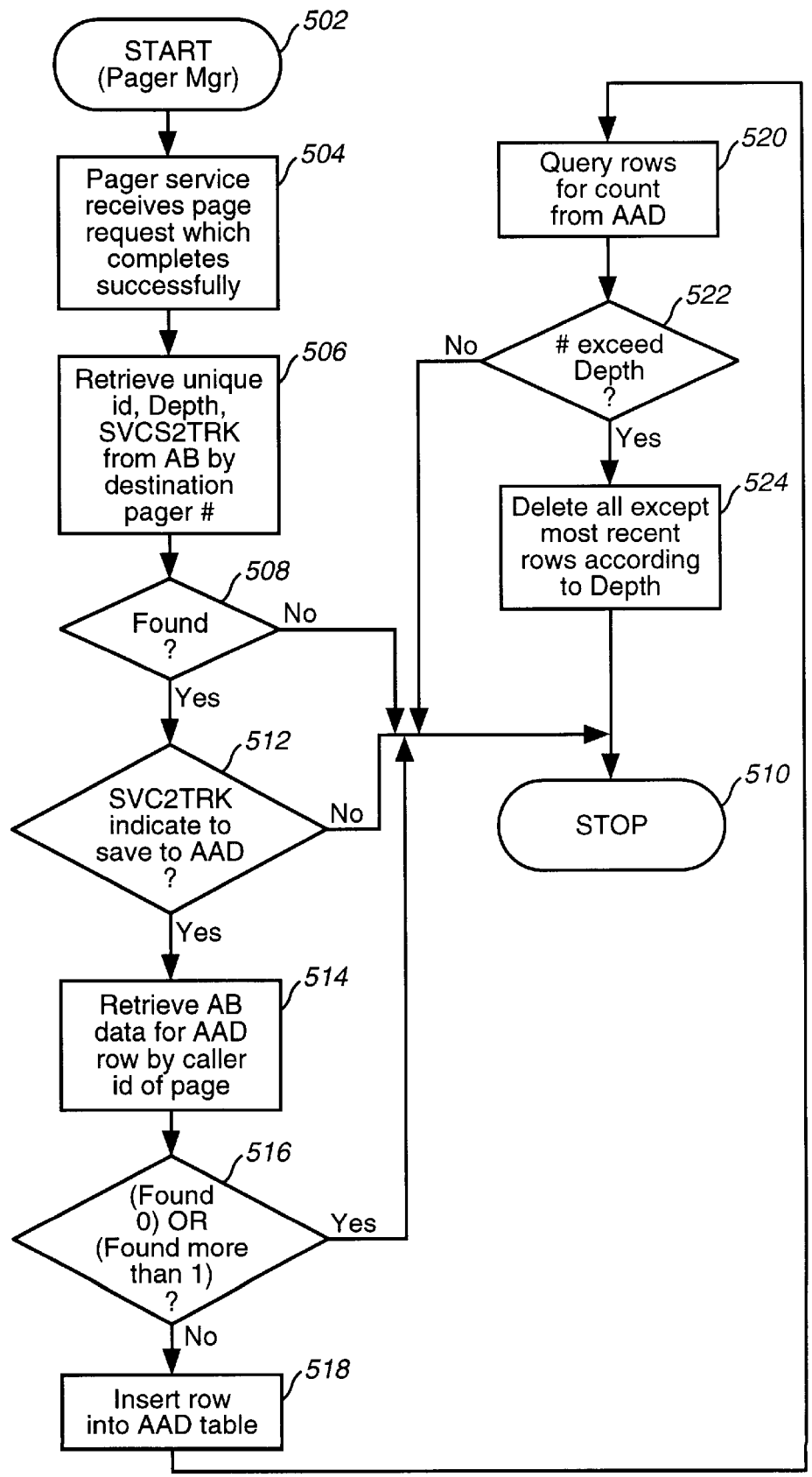
FIG. 5 illustrates operation of a pager manager 142, in connection with the present invention.

FIG. 5 illustrates operation of pager manager 142. The operation of the pager manager 142 is described here with reference to a pager service as is known in the art. The operation begins at a step 502. The pager service receives a page request that completes successfully, as shown at a step 504. This means that someone dialed into an 800 service, for example, entered a PIN code, and then dialed in a target phone number for the user to call, pressed the pound key and ended the call, thereby completing that page. The pager manager 142 is coupled to the paging system and is configured to recognize the page in a known manner. The pager manager 142 then retrieves from the AB 120 the unique ID, the depth value, and the services to track value based on using the destination of the pager number (i.e., the person/user being paged), as a key against page number field 216, as shown at a step 506. If the pager number is not found in the AB 120, as determined at a step 508, the process stops as shown at a step 510. Otherwise, the pager manager 142 determines whether the services to track value indicates that page distributions are to be tracked (i.e., saved to the AAD 122), as shown at a step 512. If not, the process stops at step 510. If page distributions are to be tracked for the person receiving the page, the pager manager 142 then retrieves the AB row corresponding to the person who sent the page using the pager's caller ID as a key against the phone number field 210, as shown at a step 514. If as determined in step 516, zero or more than one match is found, the pager manager 142 stops at step 510. An example of when the number might be in the AB 120 more than once is when a phone is shared by more than one person. Alternatively, in the case of a conference room phone no one is associated with the number. In these cases, the pager manager 142 does not track the page and ignores it. Otherwise, the pager manager 142 inserts the AB information as a row into the AAD 122, as shown at a step 518.

Next, the pager manager 142 queries the AAD rows to determine the number of rows for the user, as shown at a step 520. If the number of rows is less than the depth count as determined in step 522, the pager manager 142 stops at step 510. If the number of rows exceeds the depth count, as determined at step 522, all but the most recent number of rows equal to the depth count are deleted, as shown at a step 524. The pager manager 142 then stops at step 510.

Figure 6:
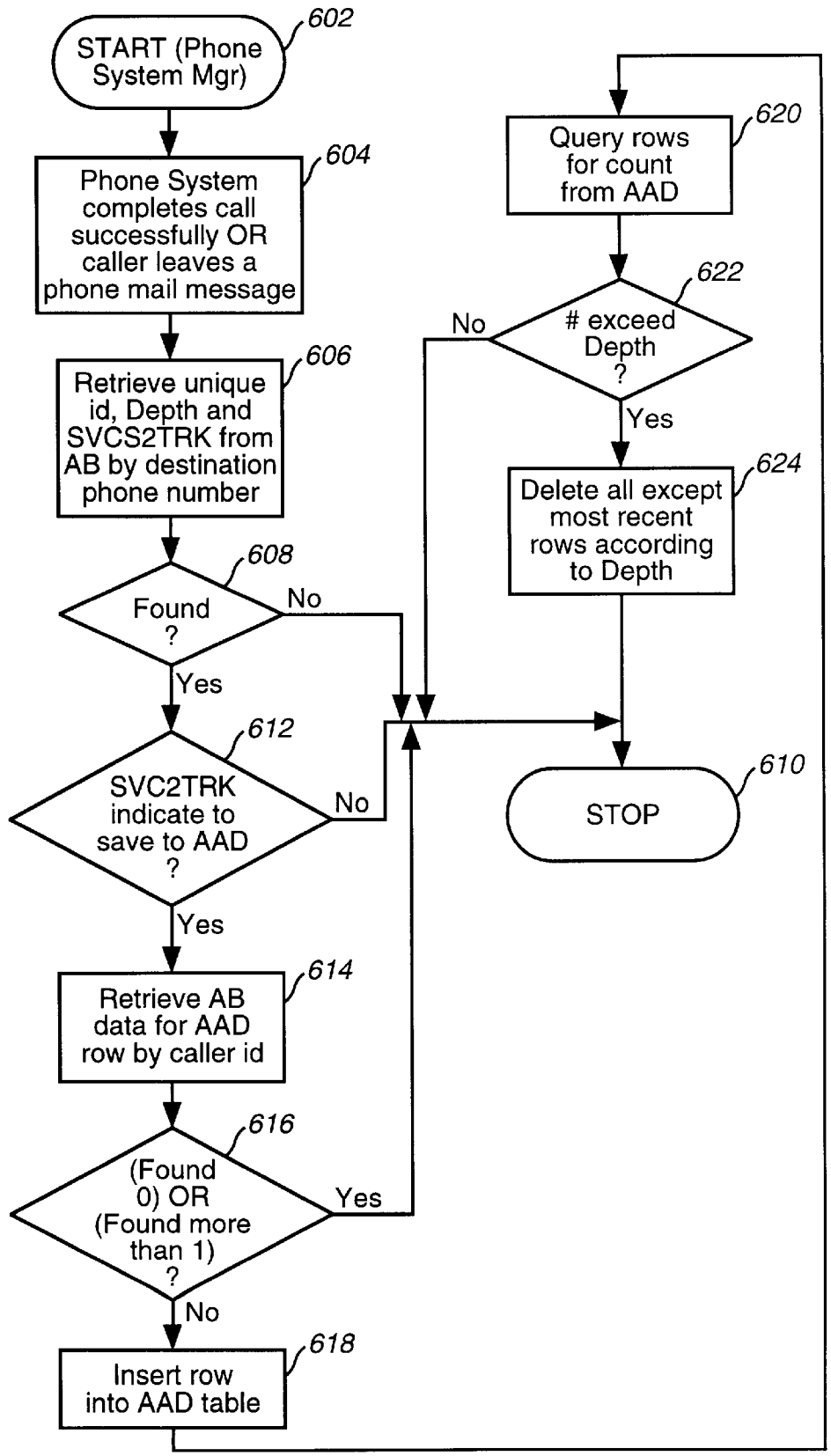
FIG. 6 illustrates operation of a phone system manager 144, in accordance with the present invention.

The operation of the phone system manager 144 is illustrated in FIG. 6. The operation begins at a step 602. In this case, operation of the phone system manager 144 begins when a phone call completes successfully or the caller successfully leaves a phone mail message, as shown at a step 604. The phone system manager 144 then retrieves from the AB 120 the unique ID for the party being called, that person's depth count, and the services to track value using the phone number that was called as a key against phone number field 210, as shown at a step 606. The number being called is provided by the PBX or in accordance with known DNIS (dialed number identification service) techniques. If the phone number is not found in the AB 120, as determined at a step 608, the process stops as shown at a step 610. Otherwise, the phone system manager 144 determines whether the services to track value indicates that phone calls are to be tracked (i.e., saved to the AAD 122), as shown at a step 612. If not, the process stops at step 610. If phone messages are to be tracked for the person receiving the call or phone message, the phone system manager 144 then retrieves the AB row corresponding to the person who made the call or left the message using the caller's ID as a key against the phone number field 210, as shown at a step 614. If zero or more than one match is found (see step 616), the phone system manager 144 stops at step 610. An example of when the number might be in the AB 120 more than once is when a phone is shared by more than one person. Alternatively, in the case of a conference room phone no one is associated with the number. In these cases, the phone system manager 144 does not track the call and ignores it. Otherwise, the phone system manager 144 inserts the AB information as a row into the AAD 122, as shown at a step 618.

Next, the phone system manager 144 queries the AAD rows to determine the number of rows for the user, as shown at a step 620. If the number of rows is less than the depth count as determined in step 622, the phone system manager 144 stops at step 610. If the number of rows exceeds the depth count, as determined at step 622, all but the most recent number of rows equal to the depth count are deleted, as shown at a step 624. The phone system manager 144 then stops at step 610.

Figure 7:
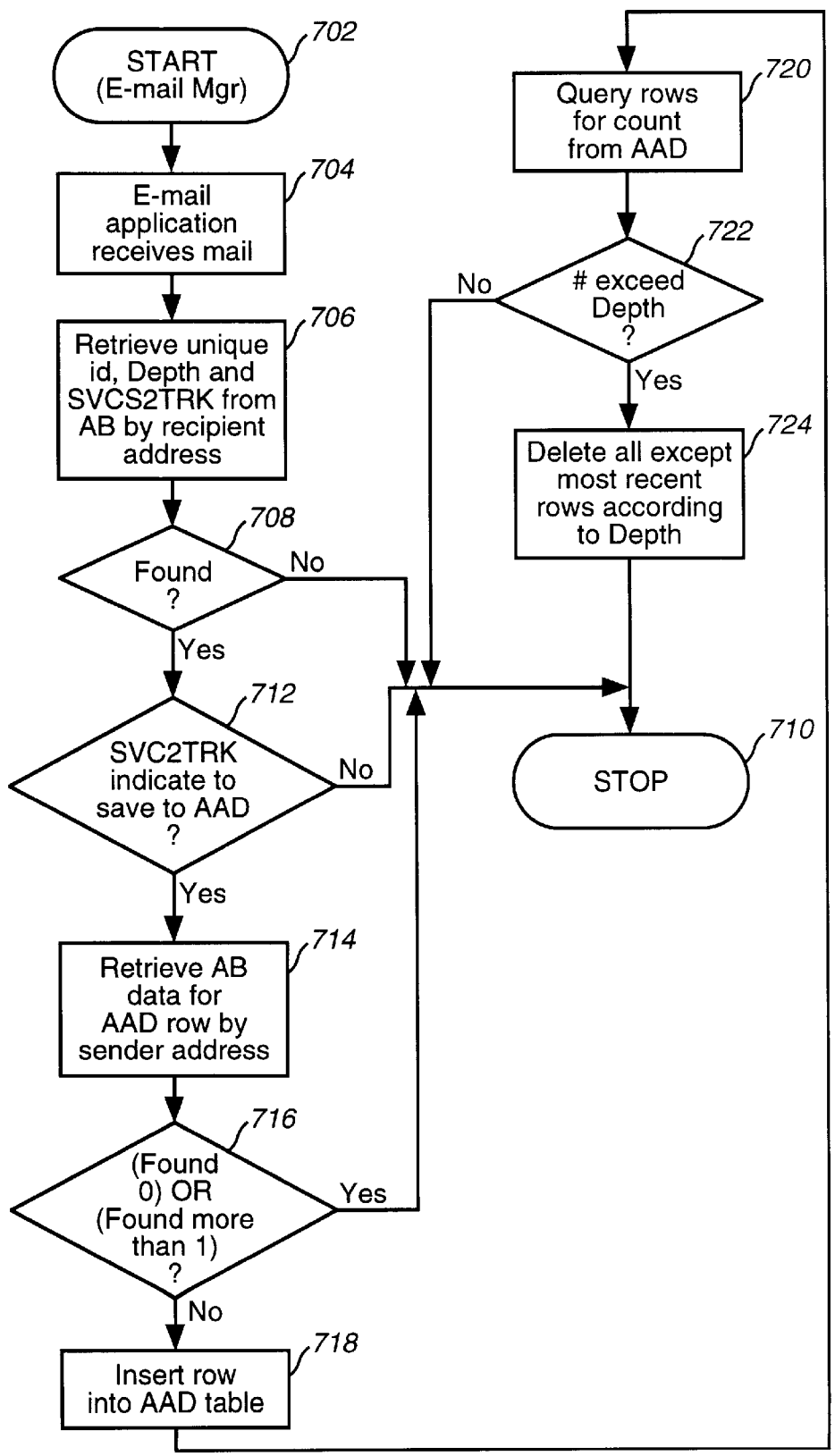
FIG. 7 illustrates operation of an E-mail manager 132, in accordance with the present invention.

The operation of E-mail manager 132 is illustrated in FIG. 7, and is substantially the same as the processing described above for the pager manager 142 and phone system manager 144, except that the E-mail manager 132 receives a destination E-mail address, rather than a pager or phone number, as shown at a step 704. The E-mail manager 132 retrieves from the AB 120 the unique ID for the recipient, and the recipient's depth count and the services to track value using the destination E-mail address as a key against E-mail ID field 208, as shown at a step 706. If the E-mail address is not found in the AB 120, as determined at a step 708, the process stops as shown at a step 710. Otherwise, the E-mail manager 132 determines whether the services to track value indicates that E-mail distributions are to be tracked (i.e., saved to the AAD 122), as shown at a step 712. If not, the process stops at step 710. If E-mail distributions are to be tracked for the person receiving the E-mail, the E-mail manager 132 then retrieves the AB row corresponding to the person who sent the E-mail using the sender's E-mail address as a key against the E-mail ID field 208, as shown at a step 714. If as determined in step 716, zero or more than one match is found, the E-mail manager 132 stops at step 710. The E-mail manager 132 inserts the AB information as a row into the AAD 122, as shown at a step 718.

Next, the E-mail manager 132 queries the AAD rows to determine the number of rows for the user, as shown at a step 720. If the number of rows is less than the depth count as determined in step 722, the E-mail manager 132 stops at step 710. If the number of rows exceeds the depth count, as determined at step 722, all but the most recent number of rows equal to the depth count are deleted, as shown at a step 724. The E-mail manager 132 then stops at step 710.

Figure 8:
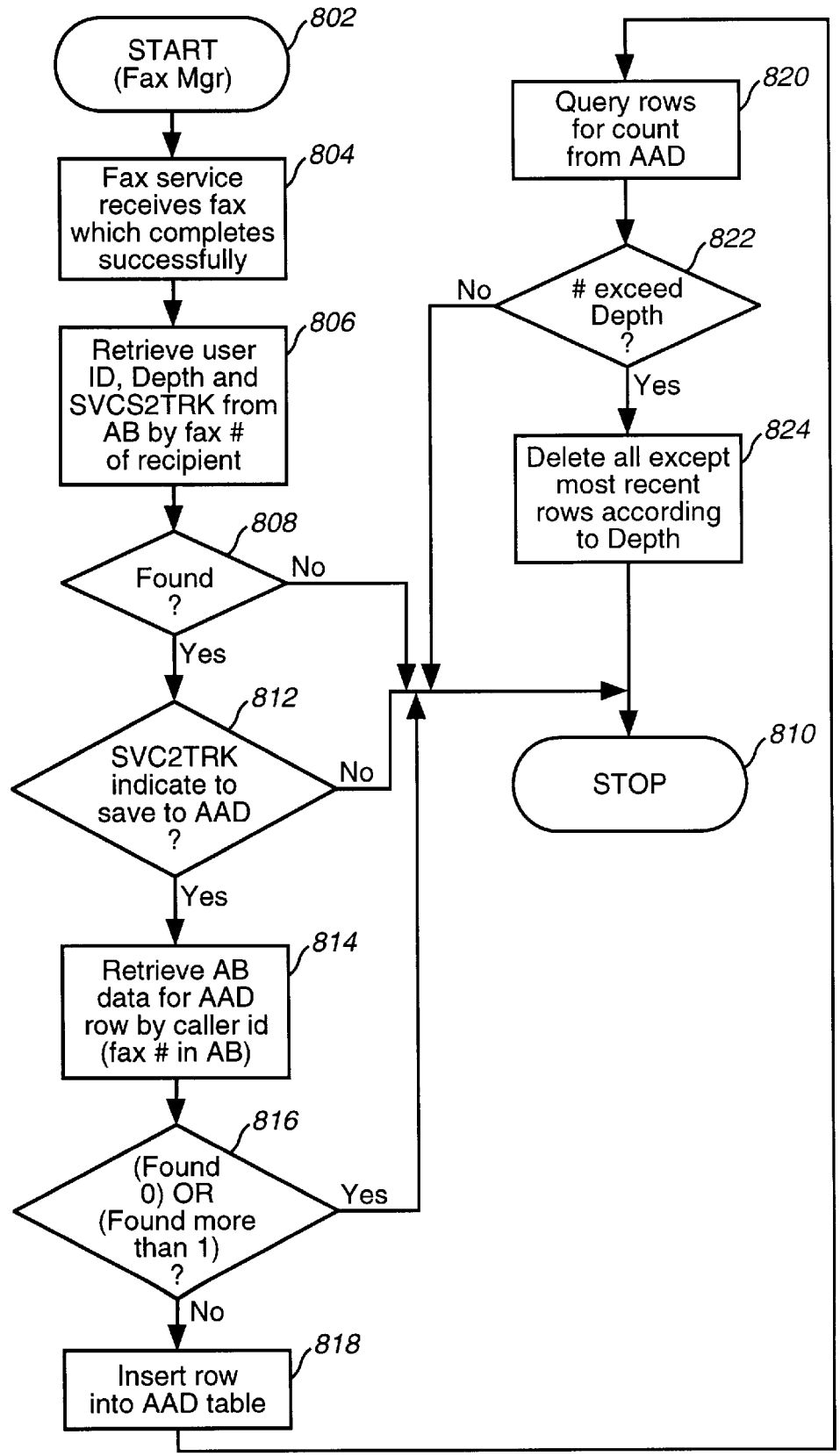
FIG. 8 illustrates operation of fax manager 134, in accordance with the present invention.

The operation of fax manager 134 is illustrated in FIG. 8, and is substantially the same as the processing described above for the other managers, except that the fax manager 134 receives a destination fax number, as shown at a step 804. The fax manager 134 then retrieves from the AB 120 the unique ID for the recipient, and the recipient's depth count and the services to track value using the recipient's fax number as a key against fax number field 214, as shown at a step 806. If the fax number is not found in the AB 120, as determined at a step 808, the process stops as shown at a step 810. Otherwise, the fax manager 134 determines whether the services to track value indicates that fax distributions are to be tracked (i.e., saved to the AAD 122), as shown at a step 812. If not, the process stops at step 810. If fax distributions are to be tracked for the person receiving the fax, the fax manager 134 then retrieves the AB row corresponding to the person who sent the fax using the sender's fax number (e.g., caller ID) from AB as a key against the fax number field 214, as shown at a step 814. If as determined in step 816, zero or more than one match is found, the fax manager 134 stops at step 810. An example of when the number might be in the AB 120 more than once is when a fax machine is shared by more than one person. In this case, the fax manager 134 does not track the fax and ignores it. Otherwise, the fax manager 134 inserts the AB information as a row into the AAD 122, as shown at step 818.

Next, the fax manager 134 queries the AAD rows to determine the number of rows for the user, as shown at a step 820. If the number of rows is less than the depth count as determined in step 822, the fax manager 134 stops at step 810. If the number of rows exceeds the depth count, as determined at step 822, all but the most recent number of rows equal to the depth count are deleted, as shown at a step 824. The fax manager 134 then stops at step 810.

Figure 9:
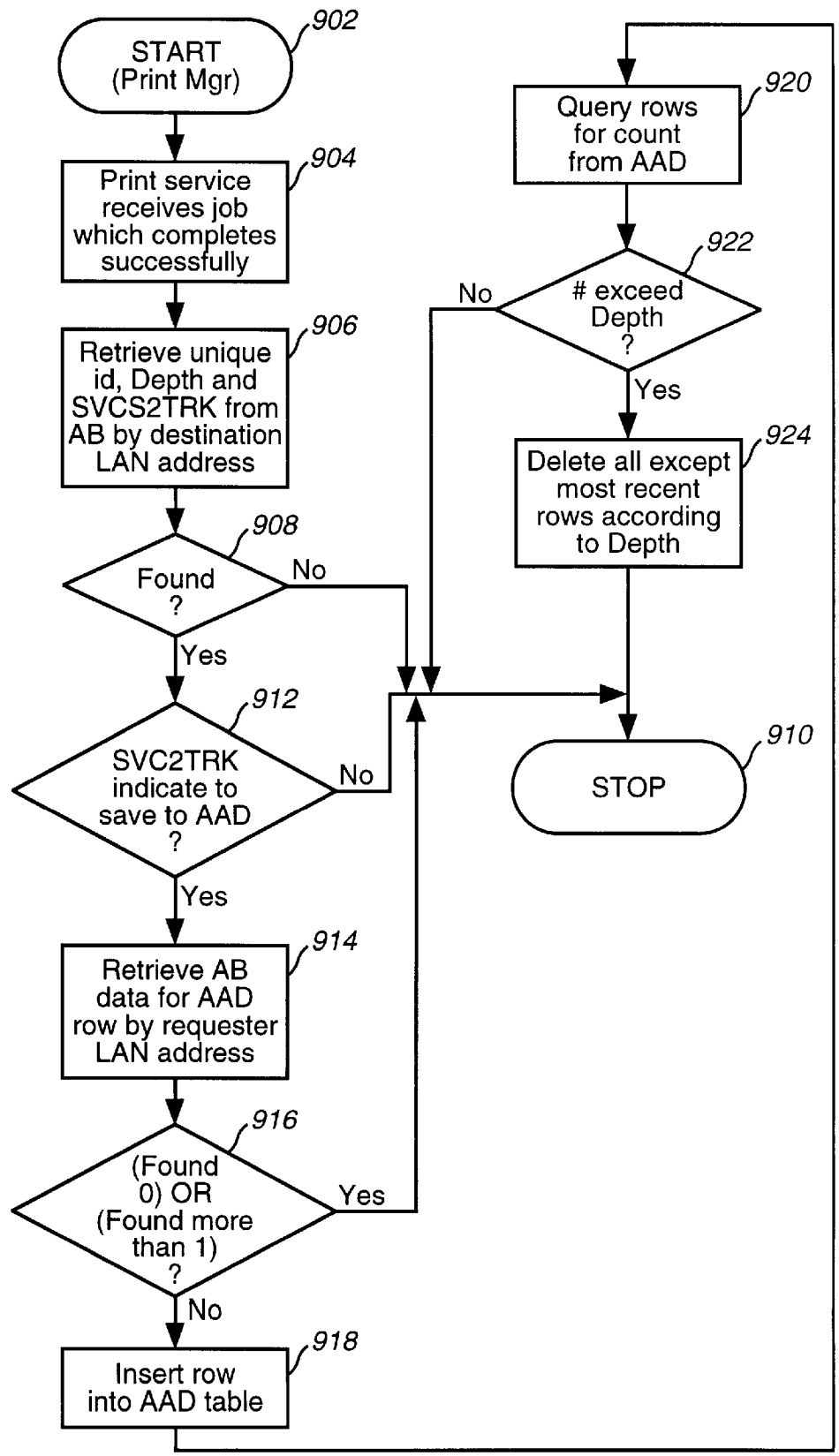
FIG. 9 illustrates operation of print manager 136, in accordance with the present invention.

The operation of print manager 136 is illustrated in FIG. 9, and is substantially the same as the processing described above for the other managers, except that the print manager 136 receives a destination LAN address, as shown at a step 904. The print manager 136 then retrieves from the AB 120 the unique ID for the recipient, and the recipient's depth count and the services to track value using the recipient's LAN address (i.e., the LAN address of the machine used to print) as a key against LAN address field 212, as shown at a step 906. If the destination LAN address is not found in the AB 120, as determined at a step 908, the process stops as shown at a step 910. Otherwise, the print manager 136 determines whether the services to track value indicates that print distributions are to be tracked (i.e., saved to the AAD 122), as shown at a step 912. If not, the process stops at step 910. If print distributions are to be tracked for the destination LAN address, the print manager 136 then retrieves the AB row corresponding to the person who sent the print request using the sender's LAN address as a key against the LAN address field 212, as shown at a step 914. If, as determined in step 916, zero or more than one match is found, the print manager 136 stops at step 910. The print manager 136 inserts the AB information as a row into the AAD 122, as shown at a step 918.

Next, the print manager 136 queries the AAD rows to determine the number of rows for the user, as shown at a step 920. If the number of rows is less than the depth count as determined in step 922, the print manager 136 stops at step 910. If the number of rows exceeds the depth count, as determined at step 922, all but the most recent number of rows equal to the depth count are deleted, as shown at a step 924. The print manager 136 then stops at step 910.

Figure 10:
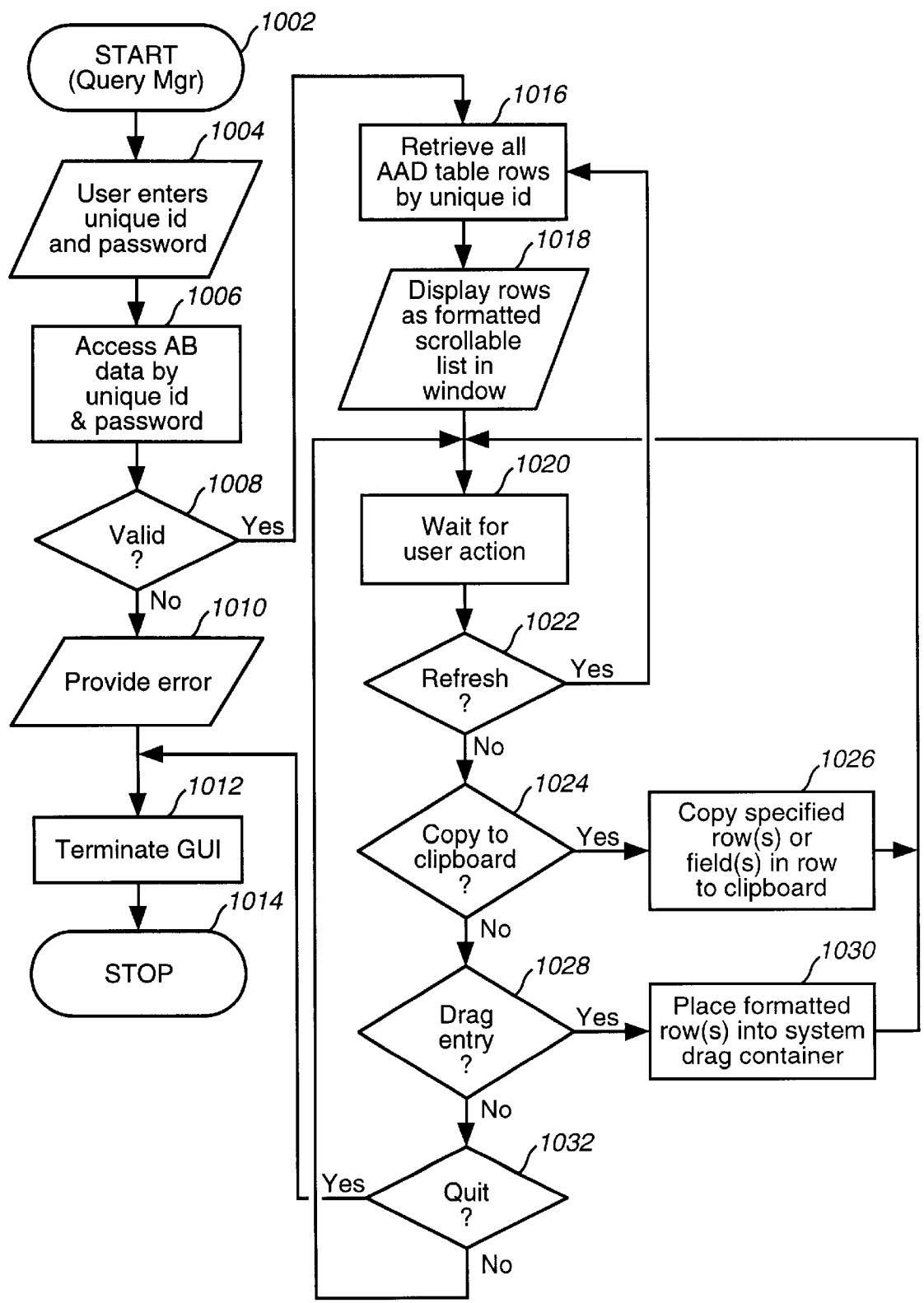
FIG. 10 illustrates operation of query manager 138, in accordance with the present invention.

The operation of query manager 138 is illustrated in FIG. 10. The operation begins at a step 1002. The query manager 138 permits the user to view and use the current distribution tracking records using his computer. The user enters his unique ID and his password, as shown at a step 1004. The query manager 138 uses the entered unique ID and password to attempt to access the address book data, as shown at a step 1006. An authentication check is performed to determine whether the unique ID and password are valid, as shown at a step 1008. If the password is not valid for the unique ID or the person does not exist in the address book according to the unique ID, an error is provided to the user, as shown at a step 1010. The query manager 138 then terminates at a step 1012 and operation stops at a step 1014.

Otherwise if the password and unique ID are valid at step 1008, the query manager 138 retrieves all the AAD table rows for the user using his unique ID as a key to access the AAD 122, as shown at a step 1016. The query manager 138 displays the user's AAD table rows in a scrollable window, for example, so that the user is able to perform four actions, as shown at a step 1018. A "wait for user action" state is then entered, as shown at a step 1020. Thereafter four contiguous decision steps are present to determine the user's action.

First, the user can either refresh the window, as shown at a step 1022. In other words, if the user received five new phone calls since the window was activated, the user can refresh the data in the window to reflect that recent activity. To refresh the window the query manager 138 returns to step 1016 to retrieve all the user's AAD table rows and then displays those rows.

Second, the user can copy a row or rows to a clipboard, as determined at a step 1024. Once the copy operation is performed, as shown at a step 1026, the process returns to the wait state step 1020.

Third, the user can drag a row or rows to the system drag container, as determined at a step 1028. If the user performs a drag and drop from the query window, step 1030 interfaces to the operating system to place the object dragged into the system drag container.

Finally, the user can quit the query manager 138, as determined at a step 1032, which causes processing to terminate and stop at steps 1012 and 1014, respectively. Alternatively, the copy and drag operations can be performed on a field or multiple field basis. Thus, the user can not only use the query manager window to see the current status of his historical distribution rows, but the user can copy to the clipboard, and/or drag information from the window to another application.

FIG. 11 illustrates processing of a hot key manager 140 (TSR) in accordance with an embodiment of the present invention. Operation of the TSR begins at a step 1102. Since the hot key manager 140 accesses information corresponding to a particular user's AAD table rows, the hot key manager 140 is started using after AB 120 validation the user's unique ID and password, as shown at a step 1104. The hot key settings must then be loaded into the user's computer memory, as shown at a step 1106. The hot key TSR must then "steal" the keyboard interrupt in order to monitor keystrokes to identify hot key combinations when invoked by the user, as shown at a step 1108, as would be apparent to a person skilled in the relevant art. Basically, the vector address of the standard keyboard handler must be replaced with the address of the TSR after it is loaded into memory. The hot key manager 140 then enters a "wait for keyboard input" state, as shown at a step 1110. If the hot key manager 140 detects a hot key terminate sequence, then it will reinstall a standard keyboard handler and it will stop, as shown at steps 1112, 114, and 1116 respectively.

The user is presented with eight (8) options by the hot key manager 140, as determined at contiguous decisional steps 1112, 1118, 1126, 1128, 1130 1132, 1134, and 1136, respectively. The user can terminate the hot key manager 140 at any time as determined at step 1112. If termination is selected, step 1112 flows to step 1114 when the TSR is terminated from memory and the standard keyboard handler address is reinstalled to the keyboard interrupt. If the hot key manager 140 determines that the user wishes to redefine hot key mapping, as shown at a step 1118, the current mappings are displayed in a scrollable window to the user, as shown at a step 1120. The user is then permitted to change the settings and the settings are saved to memory and file (for later reload of TSR), as shown at a step 1122. The user then quits from the maintenance window, as shown at a step 1124, and processing returns to the wait step 1110.

The remaining six decisional steps 1126, 1128, 1130 1132, 1134, and 1136 permit the user to retrieve AAD row data, as described above in connection with FIG. 3 and Table 1. Thus, one of these six decisional steps 1126, 1128, 1130 1132, 1134, and 1136 is entered when the control (ctr1) and shift keys are pressed together with a first letter hot key to paste information related to the last (or nth to last) distribution received, phone call received, E-mail received, fax received, print job received, or beeper (page) received, respectively. Multiple keystroke buffering is assumed at these stages of the hot key manager 140 operation in view of the fact that each hot key function requires three (3) keystrokes: ctrl/shift/first letter, followed by a second letter, followed by a number. If none of these keystrokes are received, flow proceeds from step 1136 to a step 1138, at which point the buffered keystrokes are passed to the normal keystroke handler. The process then returns to the wait state 1110. For FIG. 11, a ctrl/shift/first letter command provides the indicator that this is a relevant command to gather the following letter and number.

After one of the six decisional steps 1126, 1128, 1130 1132, 1134, and 1136 is performed, the hot key manager 140 evaluates the final number N of the hot key sequence; sets the variable CRITERIA equal to N; and sets the variable Assigning_SVC equal to the appropriate service (phone_call, E-mail, pager, fax, print, or the last distribution). These operations are shown at steps 1140, 1142, 1144, 1146, 1148, and 1150.

Thus, if the user presses the ctrl/shift/c hot key combination, that combination will be detected at step 1126. The CRITERIA we said equal to N and the Assigning_SVC will be set equal phone_call, as shown at step 1140. The hot key manager 140 then queries the AAD 122 to retrieve the row using the variables CRITERIA and Assigning_SVC, and the unique ID of the person that is performing the search, as shown at a step 1152. The unique ID of the person performing the hot key is used against the unique ID field 302 of the AAD 122 for filtering distribution rows for that particular user. Many users' history of relevant distributions are stored in the AAD 122. If the row is not found, as shown at a step 1153 the user is notified by an audible beep, or the like, as shown at a step 1154, and operation returns to the wait state 1110. If the row is found, the requested data from the retrieved AAD table row is pasted to the current cursor location, as shown at a step 1158.

The specific data within the retrieved row is determined by the hot key manager 140 by evaluating the second letter of the keystroke sequence (i.e., r, n, e, p, f, l, or b), which were described above in connection with Table 1. If the hot key manager 140 incurs an error, for example, pasting to an invalid location, as shown at a step 1160, the user is alerted via the step 1154. Otherwise, the process returns to the wait state 1110.

Alternatively, the hot key combination crtl/shift/e is detected by step 1128. If this is the case, the hot key manager 140 sets the variable criteria equal to N and sets the variable Assigning SVC_equal to E-mail, as shown at step 1142. Processing then continues to step 1152, as discussed above in the preceding paragraphs.

The hot key combination ctrl/shift/b is detected at step 1130. After this hot key sequence is detected, the hot key manager 140 sets the variable criteria equal to N and sets the variable Assigning SVC_equal to pager, as shown at step 1144. Processing then flows to step 1152, as discussed above in the preceding paragraphs.

If the hot key sequence ctrl/shift/f is entered by the user, it is detected at step 1132. The hot key manager 140 then sets the variable criteria equal to N and sets the variable Assigning SVC_equal to fax, as shown at step 1146. Processing then flows to step 1152, as discussed above in the preceding paragraphs.

If the user presses the ctrl/shift/p it will be detected at step 1134. Then the hot key manager 140 will set the variable criteria equal to N and set the variable Assigning_SVC equal to print, as shown at step 1148. Processing then flows to step 1152, as discussed above in the preceding paragraphs.

Finally, the hot key stroke ctrl/shift/d is detected at step 1136. The hot key manager 140 sets the criteria equal to N and the Assigning_SVC equal to hot key, as shown at step 1150. Processing then flows to step 1152, as discussed above in the preceding paragraphs. If no hot key sequence is detected by steps 1118, 1126, 1128, 1130, 1132, 1134 or 1136, the keystrokes are simply passed to the normal keyboard handler function, as shown at a step 1138 and processing flows back to step 1110.

Figure 12:
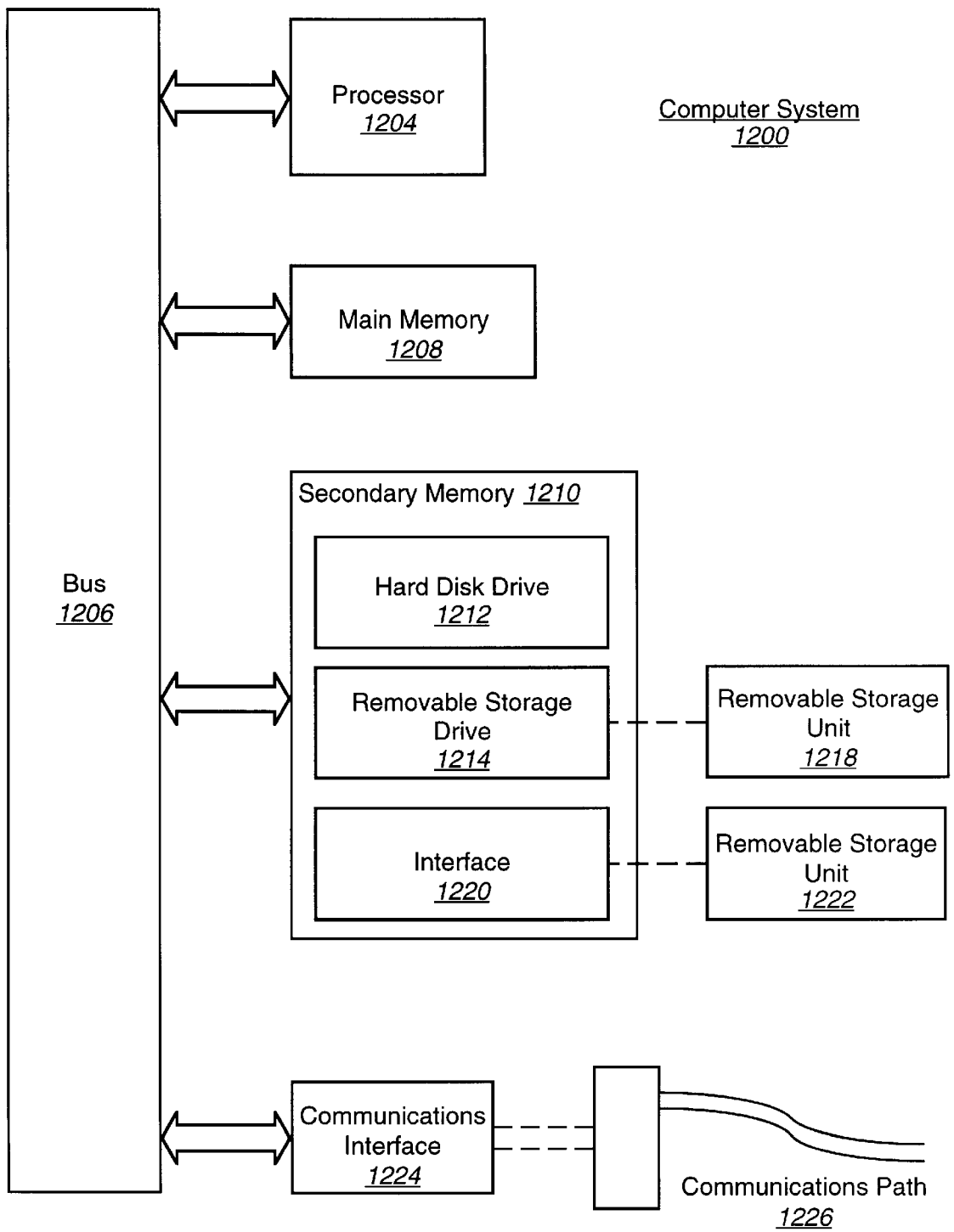
FIG. 12 is an alternative computer environment for implementing automatic distribution addressing according to the present invention.

A computer environment for implementing the invention is shown in FIG. 12. The environment is a computer system 1200 that includes one or more processors (CPU), such as processor 1204. The processor 1204 is connected to a communications bus 1206. Various software embodiments are described in terms of this example computer system. After reading this description, it will be apparent to a person skilled in the relevant art how to implement the invention using other computer systems and/or computer architectures. Computer system 1200 can be used to implement PC 104 and/or the PBX 114.

Computer system 1200 also includes a main memory 1208, preferably random access memory (RAM), and can also include a secondary memory 1210. The secondary memory 1210 can include, for example, a hard disk drive 1212 and/or a removable storage drive 1214, representing a floppy disk drive, a magnetic tape drive, an optical disk drive, etc The removable storage drive 1214 reads from and/or writes to a removable storage unit 1218 in a well known manner. Removable storage unit 1218 represents a floppy disk, magnetic tape, optical disk, etc., which is read by and written to by removable storage drive 1214. As will be appreciated, the removable storage unit 1218 includes a computer usable storage medium having stored therein computer software and/or data.

In alternative embodiments, secondary memory 1210 may include other similar means for allowing computer programs or other instructions to be loaded into computer system 1200. Such means can include, for example, a removable storage unit 1222 and an interface 1220. Examples can include a program cartridge and cartridge interface, a removable memory chip (such as an EPROM, PROM, or PCMCIA) and associated socket, and other removable storage units 1222 and interfaces 1220 which allow software and data to be transferred from the removable storage unit 1222 to computer system 1200. Any of the aforementioned memory devices can be used to implement a database.

Computer system 1200 can also include a communications interface 1224. Communications interface 1224 allows software and data to be transferred between computer system 1200 and external devices via communications path 1226. Examples of communications interface 1224 can include modem 106, printer 108, a communications port, etc. Software and data transferred via communications interface 1224 are in the form of signals that can be electronic, electromagnetic, optical or other signals capable of being received by communications interface 1224 via communications path 1226. Note that communications interface 1224 provides a means by which computer system 1200 can interface to a network such as LAN 110.

The present invention is preferably implemented using software running (that is, executing) in an environment similar to that described above with respect to FIG. 12. Thus, the term "computer program product" is used to generally refer to a program stored at removable storage device 1218 or a hard disk installed in hard disk drive 1242. These computer program products are means for providing software to computer system 1200.

Computer programs (also called computer control logic) are stored in main memory and/or secondary memory 1210. Computer programs can also be received via communications interface 1224. Such computer programs, when executed, enable the computer system 1200 to perform the features of the present invention as discussed herein. In particular, the computer programs, when executed, enable the processor 1204 to perform the features of the present invention. Accordingly, such computer programs represent controllers of the computer system 1200.

In an embodiment where the invention is implemented using software, the software may be stored in a computer program product and loaded into computer system 1200 using removable storage drive 1214, hard drive 1212 or communications interface 1224. Alternatively, the computer program product may be downloaded to computer system 1200 over communications path 1226. The control logic (software), when executed by the processor 1204, causes the processor 1204 to perform the functions of the invention as described herein.

In another embodiment, the invention is implemented primarily in hardware using, for example, hardware components such as application specific integrated circuits (ASICs). Implementation of a hardware state machine so as to perform the functions described herein will be apparent to persons skilled in the relevant art(s).

While various embodiments of the present invention have been described above, it should be understood that they have been presented by way of example, and not limitation. It will be apparent to persons skilled in the relevant art that various changes in form and detail can be made therein without departing from the spirit and scope of the invention. Thus the present invention should not be limited by any of the above-described exemplary embodiments, but should be defined only in accordance with the following claims and their equivalents. All cited patent documents and publications in the above description are incorporated herein by reference.

What is claimed is:

1. A method for addressing an outbound distribution, comprising the steps of:

receiving an inbound distribution in a telephone system, wherein said distribution includes a source identifier associated with a sender of said distribution;

determining by said telephone system said source identifier corresponding to the sender of said inbound distribution;

accessing information about said sender automatically in response to determining said source identifier wherein said information includes a distribution address; and automatically addressing an outbound distribution using said distribution address, wherein said inbound distribution and said outbound distribution are not of the same type.

2. The method according to claim 1, wherein said receiving step further comprises the step of receiving a voice mail distribution.

3. The method according to claim 1, wherein said receiving step further comprises the step of receiving a phone call distribution.

4. The method according to claim 1, wherein said receiving step further comprises the step of receiving an E-mail distribution.

5. The method according to claim 1, wherein said receiving step further comprises the step of receiving a facsimile distribution.

6. The method according to claim 1, wherein said receiving step further comprises the step of receiving a print distribution.

7. The method according to claim 1, wherein said receiving step further comprises the step of receiving a pager distribution.

8. The method according to claim 1, further comprising the step of permitting the recipient to view said information about said distribution.

9. The method according to claim 1, further comprising the step of permitting the recipient to retrieve some or all said information about said sender using hot keys.

10. The method according to claim 9, further comprising the step of permitting the recipient to modify said hot keys.

11. The method according to claim 9, wherein said step of permitting the recipient to retrieve some or all said information comprises the step of pasting said retrieved information to a cursor hot spot.

12. A system for automatic retrieval of distribution information, comprising:

an address book database;

a historical distribution correlator, wherein said correlator:

determines an identifier (ID) corresponding to a sender of a distribution to a recipient;

accesses information about said sender from said address book database using said ID wherein said information includes a distribution address;

displays said information; and automatically addressing an outbound distribution using said distribution address, wherein said outbound distribution is not the same type as said inbound distribution.

13. The system according to claim 12, wherein said communication comprises at least one of a telephone call, a voice mail distribution, an E-mail distribution, a facsimile distribution, a print distribution, and a pager distribution.

14. The system according to claim 12, further comprising means for permitting the recipient to retrieve some or all of said information using hot keys.

15. The system according to claim 14, further comprising means for permitting the recipient to modify said hot keys.

16. The system according to claim 15, wherein said keys are implemented using a terminate and stay resident (TSR) application program.

17. The system according to claim 14, wherein said means for permitting the recipient to retrieve some or all said information further comprises means for pasting said retrieved information to a cursor hot spot.

\* \* \* \* \*